Jan. 16, 1951     C. L. MERSHON     2,538,700

SYNCHRONIZING RELAY

Filed Dec. 26, 1946

WITNESSES:

INVENTOR
Clarence L. Mershon.
BY
ATTORNEY

Patented Jan. 16, 1951

2,538,700

UNITED STATES PATENT OFFICE 2,538,700

SYNCHRONIZING RELAY

Clarence L. Mershon, Lima, Ohio, assignor, by mesne assignments, to the United States of America as represented by the Secretary of the Air Force Application December 26, 1946, Serial No. 718,464

2 Claims. (Cl. 200—91)

My invention relates generally to automatic synchronizing systems and apparatus, and more particularly, to a synchronizing relay particularly adapted for use in electrical systems for supplying auxiliary power on aircraft and the like where lightweight, reliable and sensitive apparatus is necessary.

In the operation of electrical systems for supplying auxiliary power on large aircraft where two or more alternators are used, it is necessary to provide for automatically synchronizing and connecting the incoming alternators to the load bus as the load demand varies. The general arrangement of the system is that one alternator is normally connected to the load bus but whenever additional power is required, other alternators, usually two or three in number, are automatically connected and disconnected with load variation. This requires the use of automatic synchronizing devices of some kind which will effect the automatic connection of the incoming alternator at the proper time, that is, when the voltages of the load bus and the incoming alternator are in phase and the frequency difference is of such magnitude that the incoming alternator will pull into synchronism with the other alternator connected to the load bus. The problem to be overcome in the operation of systems of this kind is the provision of a suitable synchronizing relay of a simple and reliable nature which functions to effect automatic synchronizing at the proper phase relation and slip frequency and which, in the case of aircraft, will not be unduly affected by the operating conditions encountered, such as vibration. Accordingly, it is to the solution of this problem that my invention is primarily directed.

The object of my invention, generally stated, is to provide a synchronizing relay of the character described which shall be of simple and lightweight construction, economical to manufacture, and which shall function to effectively connect the incoming alternator to the load bus at the proper time.

A more specific object of my invention is to provide for utilizing a relay of the rotary type as an automatic synchronizing relay for use in controlling the connection of an incoming alternator to a load bus.

A further object of my invention is to provide a sychronizing relay of the character described having an adjustable damping mechanism which shall cause the relay to operate only at a desired slip frequency with a minimum of time lag.

A further object of my invention is to provide an automatic synchronizing system for controlling the connection of an incoming alternator to an energized load bus which employs, as a primary controlling element, a synchronizing relay of the rotary type with an adjustable damping mechanism.

These and other objects of my invention will become more apparent from the following detailed description of a preferred embodiment thereof when read in conjunction with the drawing, in which.

While my invention will be described and illustrated in connection with electrical generating systems for aircraft, it is to be understood that it also has application to other types of electrical power supply systems.

In practicing my invention in its preferred form, I utilize, as a synchronizing relay, a relay of the rotary type comprising a laminated core structure having opposing pole pieces with a laminated armature rotatably mounted therebetween. A suitable coil for energizing the magnetic circuit is positioned on the core between the pole pieces. The armature shaft carries an arm, at one end of which is mounted the movable contact element of a control switch. The stationary contact element is mounted on the relay frame. The arm is biased by means of a suitable tension spring in a switch-closing direction. The biasing spring is so mounted with relation to the axis of rotation of the arm that, as the arm is moved in a switch-opening direction, the center line of the spring approaches the axis of rotation of the arm, thus decreasing the restoring force tending to close the control switch. The relay is provided with an adjustable support for one end of the tension spring which is operable to adjust both the tension of the spring tending to rotate the arm in a switch-closing direction and the position of the center line of the spring with respect to the axis of rotation of the arm when the arm is in its full switch-opening position. The relay is also provided with means to adjust the limit of movement of the arm in either direction, The purpose of this arrangement is to enable the spring to function as a damping means so as to cause the relay, when connected to be responsive to the vector difference of the voltages of the load bus and incoming alternator, to close the control switch when these voltages are in phase and the slip frequency is of such a low value as to effect satisfactory synchronization of the incoming alternator with the load bus.

Figure 2:
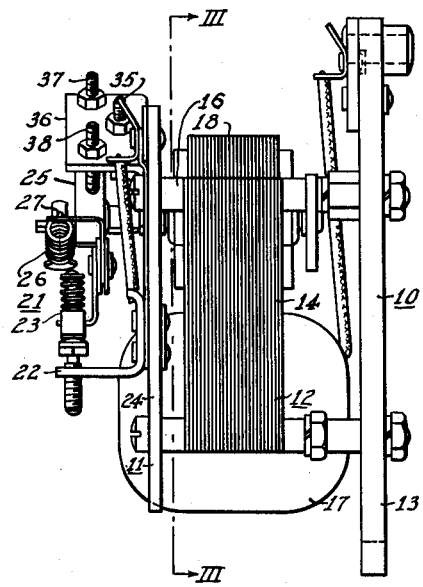
Fig. 2 is a side elevational view of the relay of Fig. 1.

Referring now to the drawing, a preferred embodiment of my synchronizing relay comprises, generally, a mounting plate assembly 10, an end plate assembly 11 and a core assembly 12 mounted therebetween as clearly shown in Fig. 2. The mounting plate assembly 10 comprises a mounting plate 13 which supports the other elements of the relay structure. The end plate assembly 11 is supported from the mounting plate 13 and, in turn, supports the control and adjusting elements of the relay.

Figure 3:
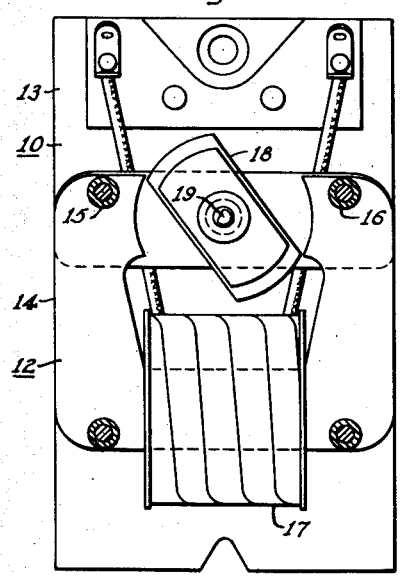
Fig. 3 is a sectional view taken along the line III—III of Fig. 2.

The core assembly 12 comprises a generally U-shaped laminated core structure 14 having opposed pole pieces 15 and 16 as shown best in Fig. 3. A coil 17 is mounted on the core between the pole pieces.

An armature 18 of laminated construction is rotatably mounted between the pole pieces 15 and 16 of the core on the shaft 19 which is journalled in suitable bearings, not shown.

The relay also embodies a control switch shown generally at 21 which comprises an adjustable stationary contact element 22 and a movable contact element 23. The contact element 22 is mounted on the end plate portion 24 of the end plate assembly, as shown in Fig. 2.

Figure 1:
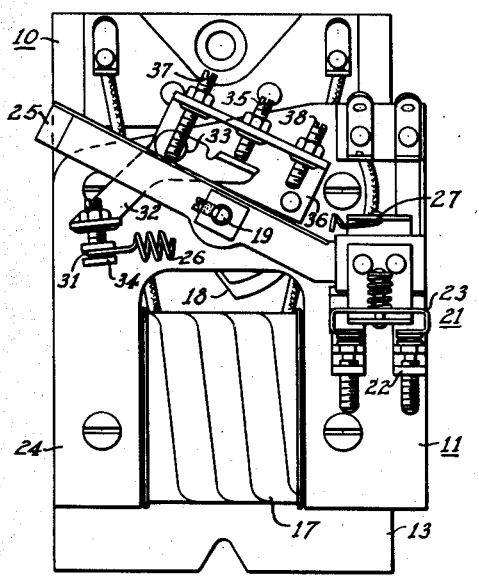
Figure 1 is a front elevational view of a synchronizing relay embodying the principal features of my invention.

In order to provide for actuating the control switch 21 in accordance with the movements of the armature 18, the movable contact element 23 thereof is mounted upon the end of an arm 25 attached intermediate its ends to one end of the armature shaft 19, as shown best in Fig. 1. It will be observed that the arm 25 moves or rotates in a plane parallel to the end plate 24. The switch-opening direction of movement is counterclockwise and the switch-closing direction of movement is clockwise.

In this embodiment of the invention, the armature movement is damped and otherwise controlled by means of a suitable coil tension spring 26 having one end attached to the arm 25 at 27 and the other end adjustably anchored to the end plate 24.

It is necessary and desirable to so control the operation of the relay that it will effect the closure of the control switch 21 at the proper instant to effect a satisfactory synchronizing operation. This requires that the relay be damped so that it will respond only to an in-phase condition of the voltages of the load bus and incoming alternator when the frequency difference is low. Another requirement is that the relay function without appreciable time lag when the proper conditions exist.

In order to accomplish these results, the tension spring 26, which functions normally to bias the arm 25 in a switch-closing direction, is so positioned and adjusted that the relay will be properly damped and not respond to an in-phase condition unless the slip frequency is also at a proper low value.

It will be observed that the tension spring in this instance is positioned in a plane parallel to the plane of movement of the arm 25 and that its center line is positioned below the axis of rotation of the arm, that is, below the armature shaft 19.

In order to provide for properly adjusting the position and tension of this spring, its free end 31 is anchored to the end plate 24 by means of a lever 32 which is pivotally attached intermediate its ends to the end plate at 33. The end of the spring is attached to one end of the lever by means of an adjustable screw 34, as shown in Fig. 1. The lever 32 is adjusted and retained in any desired position by means of an adjusting screw 35 mounted on an adjusting plate 36 which, in turn, is supported by the end plate 34.

It will be apparent that by means of this arrangement the lever 32 may be rocked about its pivot support 33 so as to adjust the tension of the spring 26. The exact position of the center line of the spring with respect to the axis of rotation of the arm 25 may be adjusted by the screw 34. It is possible, therefore, to accurately adjust the tension and position of the spring so as to apply the proper amount of restoring force to the arm 25 to effectively damp the operation of the relay and cause it to respond to slip frequencies of a desired value.

The movements of the arm 25 in both directions may be limited by means of the adjusting screws 37 and 38 also mounted in the adjusting plate 36. The adjusting screw 38 determines the limit of movement of the arm 25 in the switch-opening direction and it, of course, enters into the adjustment of the relay or relative position between the center line of the spring and the axis of rotation of the arm.

Figure 4:
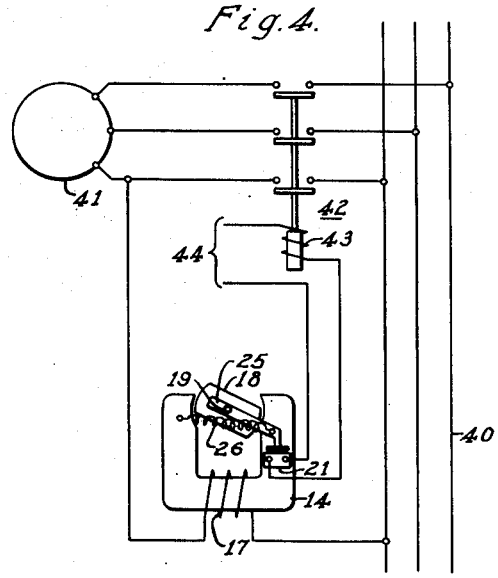
Fig. 4 is a diagrammatic view of an automatic synchronizing system utilizing the synchronizing relay of my invention.

The relay of my invention may be used as shown schematically in Fig. 4. It will be observed that the operating coil 17 is connected to be responsive to the vector difference of the voltages of the load bus 40 and incoming alternator 41. The alternator is connected to the load bus by means of a suitable circuit breaker 42 illustrated here as a simple contactor having a closing coil 43 energized from a current source 44.

The control switch 21 of the relay is connected to control energization of the closing coil 43 of the circuit breaker.

It will be understood that with this arrangement, the arm 25 will be rotated to its full switch-opening position when the voltages of the load bus and incoming alternator are out of phase. When these voltages come into proper phase relation, the restoring force of the spring 26 will tend to close the control switch by rotating the arm 25 in a switch-closing direction provided the slip frequency has decreased to a proper low value. If the slip frequency is high, that is, too high for proper synchronizing, the damping influence of the spring on the armature prevents movement of the arm 25 in a switch-closing direction. The slip frequency at which the relay will operate to close the control switch 21 may be readily and accurately adjusted by adjusting the position and tension of the tension spring 26 as described hereinbefore.

It will also be apparent that once the relay has started to close, that is, the arm 25 started in a switch-closing direction, the effect of the spring 26 becomes greater as its center line moves away from the axis of rotation of the arm and the movement of the arm is greatly accelerated. This provides the necessary quick action in order to effect the connection of the incoming alternator to the load bus without appreciable delay after proper synchronizing conditions have been reached. In actual practice, it is desirable to so adjust the tension spring 26 that the arm 25 will start to move in the switch-closing direction slightly before the in-phase position or condition of the voltages of the load bus and incoming alternator is reached. The short time lag in the operation of the relay then provides for effecting the connection of the incoming alternator at the in-phase point.

In view of the foregoing, it will be apparent that my invention provides a simple and reliable synchronizing relay which is particularly adapted for use in electrical systems for aircraft where space and weight are limited. By means of the damping arrangement utilized, I have been able to make use of a simple and reliable relay of the rotary type and have eliminated the use of other forms of damping mechanisms, such as dashpots and the like. The arrangement is such that the damping adjustment may be readily and accurately made and is unaffected by weather or temperature conditions or anything of that kind. The damping arrangement utilized not only provides for accurately controlling the closing operation of the relay but also renders it unresponsive to vibration.

While I have disclosed a preferred embodiment of my invention, it is to be understood that the principles thereof may be utilized in other forms.

I claim as my invention:

1. An automatic synchronizing relay for controlling the connection of an incoming alternator to a load bus comprising, a U-shaped laminated core structure having a pair of leg portions with opposing pole pieces and a single leg connecting portion, a laminated rotor positioned between said pole pieces, a shaft rotatably supporting said rotor, a coil mounted on the single leg connecting portion of the core structure between the pole pieces, an arm attached intermediate its ends to one end of the armature shaft, a control switch having a stationary contact element mounted on the relay and a movable contact element carried on one end of the arm, a tension spring having one end thereof attached to said one end of the arm, a rotatably mounted lever, means attaching the other end of the spring to one end of the lever, means engaging the opposite end of the lever for rotating the lever to adjust the position thereof to vary the spring tension, said tension spring being so positioned relative to the arm that it normally biases said arm in a switch-closing direction and the center line of the spring moves toward the axis of rotation of the arm when it is moved in a switch-opening direction, an adjustable stop for limiting the rotation of the arm in a switch opening direction, and adjustable stop for limiting the movement of said arm in a switch closing direction, whereby when the coil is connected to be energized in accordance with the vector difference of the voltages of the load bus and incoming alternator the arm is actuated in a switch-opening direction against the restoring force of the spring which decreases to a minimum at the full open position of the switch and is released when said voltages come into phase and the frequency difference attains a predetermined value.

2. An automatic synchronizing relay for controlling the connection of an incoming alternator to a load bus comprising, a U-shaped laminated core structure having a pair of leg portions with opposing pole pieces and a single leg connecting portion, a laminated rotor positioned between said pole pieces, a shaft rotatably supporting said rotor, a coil mounted on the single connecting portion of core structure between the pole pieces, an arm attached intermediate its ends to one end of the armature shaft, a control switch having a stationary contact element mounted on the relay and a movable contact element carried on one end of the arm, a tension spring having one end thereof attached to said one end of the arm, a rotatably mounted lever member for adjustably supporting the other end of the tension spring in a plane parallel to the plane of movement of the arm with the center line of the spring on one side of the armature shaft to normally bias the arm in a switch-closing direction, a first adjustable member connecting the spring to one end of the lever member to provide for adjusting the position of the centerline of the spring relative to the axis of rotation of the arm, a second adjustable member engaging the opposite end of the lever member for retaining said member in a desired position against the pull of the spring and for rotating the lever to adjust the spring tension, said arrangement of first and second adjusting members and lever member functioning to permit of adjustment of spring tension and spring centerline position relative to the axis of rotation of the arm to accurately adjust the restoring force on the arm when it is moved in a switch-opening direction, and an adjustable stop member for limiting the movement of the arm in a switch-opening direction, whereby when the core is energized by a voltage representing the vector difference of the voltage of the load bus and incoming alternator the arm is held in a switch-open position until said voltages are in phase and the frequency difference decreases below a predetermined value as determined by the spring tension and position.

CLARENCE L. MERSHON.

REFERENCES CITED

The following references are of record in the file of this patent:

UNITED STATES PATENTS

| Number | Name | Date |
|---|---|---|
| 1,758,749 | Knight | May 13, 1930 |
| 1,767,104 | Volkman et al. | June 24, 1930 |
| 2,092,478 | Sommermeyer | Sept. 7, 1937 |
| 2,173,378 | Seeger et al. | Sept. 19, 1939 |
| 2,324,370 | Debrey | July 13, 1943 |

FOREIGN PATENTS

| Number | Country | Date |
|---|---|---|
| 69,598 | Austria | Aug. 10, 1915 |
| 105,186 | Germany | Sept. 11, 1898 |